US006452171B1

(12) United States Patent
Moloni

(10) Patent No.: US 6,452,171 B1
(45) Date of Patent: Sep. 17, 2002

(54) METHOD FOR SHARPENING NANOTUBE BUNDLES

(75) Inventor: Katerina Moloni, Middleton, WI (US)

(73) Assignee: Piezomax Technologies, Inc., Middleton, WI (US)

( * ) Notice: Subject to any disclaimer, the term of this patent is extended or adjusted under 35 U.S.C. 154(b) by 73 days.

(21) Appl. No.: 09/621,710

(22) Filed: Jul. 24, 2000

Related U.S. Application Data
(60) Provisional application No. 60/145,427, filed on Jul. 23, 1999.

(51) Int. Cl.$^7$ ............................................... G01N 13/16
(52) U.S. Cl. ...................... 250/307; 250/423 F; 445/24
(58) Field of Search ................................ 250/306, 307, 250/423 F; 445/24

(56) References Cited

U.S. PATENT DOCUMENTS

| | | | | |
|---|---|---|---|---|
| 5,973,444 A | * | 10/1999 | Xu et al. ..................... | 313/309 |
| 6,146,227 A | * | 11/2000 | Mancevski .................... | 445/24 |
| 6,159,742 A | * | 12/2000 | Lieber et al. ................ | 436/164 |
| 6,232,706 B1 | * | 5/2001 | Dai et al. .................... | 313/309 |
| 6,283,812 B1 | * | 9/2001 | Jin et al. ...................... | 445/24 |

FOREIGN PATENT DOCUMENTS

| | | |
|---|---|---|
| WO | WO 98/05920 | 12/1998 |

OTHER PUBLICATIONS

T. R. Albrecht, P. Grutter, D. Horne and D. Rugar, "Frequency modulation detection using high–Q cantilevers for enhanced force microscope sensitivity," *J. Appl. Phys.* 69, pp. 668–673, 1991.

H. J. Dai, J. H. Hafner, A. G. Rinzler, D. T. Colbert and R. E. Smalley, Nanotubes as nanoprobes in scanning probe microscopy, *Nature* 384, pp. 147–150, 1996.

H. Edwards, L. Taylor and W. Duncan, "Fast, high–resolution atomic force microscopy using a quartz tuning fork as actuator and sensor," *J. Appl. Phys.* 82, pp. 980–984, 1997.

J. H. Hafner, C. L. Cheung and C. M. Lieber, "Growth of nanotubes for probe microscopy tips," *Nature* 398, pp. 761–762, 1999.

K. Karrai and R. D. Grober, "Piezoelectric tip–distance control for near field optical microscopes," *Appl. Phys. Lett.* 66, pp. 1842–1844, 1995.

D. P. Tsai and Y. Y. Lu, "Tapping–mode tuning fork force sensing for near–field scanning optical microscopy," *Appl. Phys. Lett.* 73, pp. 2724–2726, 1998.

E. W. Wong, P. E. Sheehan and C. M. Lieber, "Nanobeam Mechanics: Elasticity, Strength, and Toughness of Nanorods and Nanotubes," *Science* 277, pp. 1971–1975, 1997.

Y.–W. Mo, D. E. Savage, B. S. Swartzentruber, and M. G. Lagally, "Stress–Induced Self–Organization of Nanoscale Structures in SiGe/Si Multilayer Films", *Phys. Rev. Letters* 65, pp. 1020, 1990.

Q. Zhong, D. Innis, K. Kjoller and V. B. Elings, "Fractured polymer/silica fiber surface studied by tapping mode atomic force microscopy," *Surf. Sci.* 290, pp. L385–L688–692, 1993.

* cited by examiner

*Primary Examiner*—Bruce Anderson
(74) *Attorney, Agent, or Firm*—Joseph T. Leone, Esq.; DeWitt Ross & Stevens S.C.

(57) ABSTRACT

Disclosed is a method for sharpening a nanotube bundle. The method includes providing a substrate having at least one V-shaped groove disposed therein and further having a thin layer of conductive material coated thereon; disposing a nanotube bundle within the V-shaped groove; and then applying a voltage to the nanotube bundle, whereby the outermost portions of the nanotube bundle are burned away, thereby exposing a single nanotube. The resulting product is a sharpened nanotube bundle ideally suited as a probe for scanning force microscopy.

21 Claims, 12 Drawing Sheets

100 nm conventional new tip initially after 1 hour after 15 hours nanotube tip initially after 1 hour after 9 hours

METHOD FOR SHARPENING NANOTUBE BUNDLES

CROSS-REFERENCE TO RELATED APPLICATIONS

This application claims priority under 35 USC §119(e) to U.S. provisional patent application serial No. 60/145,427, filed Jul. 23, 1999, the entirety of which is incorporated by reference herein.

FIELD OF THE INVENTION

The invention relates to scanning probe microscopy. In particular, the invention relates to probes for use in scanning probe microscopy.

BIBLIOGRAPHIC CITATIONS

Complete bibliographic citations to the references discussed herein are contained in the Bibliography section, directly following the Detailed Description.

BACKGROUND OF THE INVENTION

A scanning probe microscope (SPM) uses a probe to scan the surface of a sample and provides a three-dimensional image of atoms or molecules on the surface of the object. The probe is an extremely sharp point that can be as narrow as a single atom at the tip. There are several different types of scanning probe microscopy, including scanning tunneling microscopy (STM), scanning force microscopy (SFM), atomic force microscopy (AMF), magnetic force microscopy (MFM), and magnetic resonance force microscopy (MRFM).

Carbon nanotube tips (CNTs) offer many advantages over the standard SFM probes, namely high aspect ratio, high resolution, durability, minimal tip or sample damage and, perhaps most important, tailoring. CNTs for SFM are described, for example, in WO 98/05920, published Feb. 12, 1998. CNTs as probes for surface metrology are very useful. Their high-aspect ratio enables profiling morphologies that are inaccessible to conventional probes.

Since the commercialization of SFM, a variety of probes have been developed to meet specific sample characterization requirements. The work of Dai et al. (1) introduced a novel probe: CNTs. Although CNTs are not widely used, they offer many advantages over the standard SFM probes. The potential of CNTs as probes for metrology rests on their very desirable properties, including the following. First, because they are long tubes (tubes with lengths from nanometers to several micrometers can be fabricated as metrology probes), they have a high aspect ratio. Thus, even if there were no enhancement in resolution (i.e., the nanotube end form relative to that of conventional probes) metrology probes using nanotubes can profile morphologies that are inaccessible to conventional probes.

Second, the end form of nanotubes or nanotube bundles is invariably smaller than 20 nm diameter, and can be made as small as 3 nm, providing resolution of this order. Whereas a previously un-used conventional tip can achieve 20 nm resolution, it rapidly degrades within two or three scans. Resolutions better than 20 nm are not routinely obtainable with conventional tips.

Third, the mechanical properties of the tubes are such that they do not break or wear. Even if the tubes were to provide no improvement in resolution, this feature is essential for several reasons: 1) no change in resolution over time, unlike other probes presently in use; 2) reliability-no debris left in any of the regions that have been probed, unlike other probes; 3) reduced down time for probe changes, a significant advantage for a real-time, on-line tool, such as in process inspection and characterization of advanced microelectronic device structures.

Fourth, the mechanical properties (i.e., compliancy) of the probe are adjustable because tubes can be fabricated in bundles of various sizes. The resolution need not be degraded, as is described below. In many cases a stiffer probe is advantageous.

Additionally, short nanotubes may also have applications in direct-contact nanolithography and microscopy. Furthermore, one third of nanotubes, and of bundles likely more, are conducting. Hence, in addition to topographic and morphological imaging, there are opportunities to use nanotube probes for electrical measurements with nanometer-scale lateral resolution, for example in capacitance/voltage (CV) profiling of surfaces.

The current most common method for CNT fabrication consists of manually attaching the carbon nanotubes onto commercial SFM tips using a thin adhesive, such as scanning electron microscope (SEM) carbon tape. Alternative methods, in which the nanotubes are grown directly onto SFM tips using catalytic methods, have recently been demonstrated by various researchers (2, 3).

The attached nanotubes can be multi-wall nanotubes (MWNT) or single-wall nanotubes (SWNT). Most of the CNTs produced by attachment consist of a bundle of MWNTs or SWNTs that is often too long to function in SFM. The length of the CNT can be tailored to the desired value by applying voltage between the tip and the sample in the SFM. A voltage of 5–10 V is normally adequate to "burn" part of the bundle, thereby shortening the length of the bundle. However, when using this process, the geometry at the working end of the shortened nanotube bundle is arbitrary because the "burning" procedure is uncontrolled. While a resolution of 20 nm to 50 nm is achieved very easily using the convention route of CNT shortening, further improvements in resolution using CNTs are needed. This requires developing a technique that controllably exposes only one nanotube from the bundle, such as the method described herein.

SUMMARY OF THE INVENTION

The invention, which is defined by the claims set out at the end of this disclosure, is intended to solve at least some of the problems noted above. A method is provided that involves fabrication of carbon nanotube tips (CNTs) using a thin adhesive for attaching the carbon nanotubes onto commercial scanning force microscopy (SFM) tips or multi-wall carbon nanotubes (MWNT).

Described herein is a method for controlling the end-form of a nanotube bundle so that a single nanotube protrudes from it. In the preferred embodiment, the nanotube bundle is mounted on a silcon tip, such as a silicon whisker attached to a cantilever. This improvement of resolution with CNTs relies on techniques that controllably expose one nanotube from the bundle. In the case of SWNT bundles, this improves the resolution by an order of magnitude, because the diameter of a SWNT is approximately 1 nm.

An equally important issue is throughput, which is related to the speed of imaging. More effort needs to be directed at improving the speed of operation in the intermittent-contact mode (4). This mode will be necessary in most high-performance profiling and will most likely be an absolute requirement when high-aspect-ratio features (e.g., deep holes in next-generation device fabrication) must be probed, because the probe will have to be long and narrow and changes in morphology will occur suddenly. Increased speed will require fast resonator/sensor modules, which demand mechanical structures with higher resonant frequencies and high values of Q and also better driving and feedback electronics. (Q is a measure of the ability of a system with periodic behavior to store energy as compared to the energy dissipated per cycle.) Higher speed will be essential if critical-dimension tools and profilometers are to become routine in process inspection and monitoring in the semiconductor device industry.

Also described herein is the combination of tuning forks (5) and nanotubes for use as probes for SPM. The nanotubes are mounted on the tuning forks using the same method as for regular Si cantilevers.

Further advantages, features, and objects of the invention will be apparent from the following detailed description of the invention in conjunction with the associated drawings.

DETAILED DESCRIPTION OF THE INVENTION

1. Carbon Nanotubes
1.1. Carbon Nanotube End Forms

The great advantage of the method described herein is that, in the case of single wall nanotube (SWNT) bundles, the method improves the resolution achievable using a scanning force microscope (SFM) in conjunction with a carbon nanotube (CNT) by an order of magnitude or more. This is because the diameter of a SWNT is approximately 1 nm. By using a tip whose working end is only a single exposed nanotube, it is this single nanotube whose interaction with the sample that is being measured, rather than the interaction of an uncharacterized bundle of nanotubes.

Figure 1:
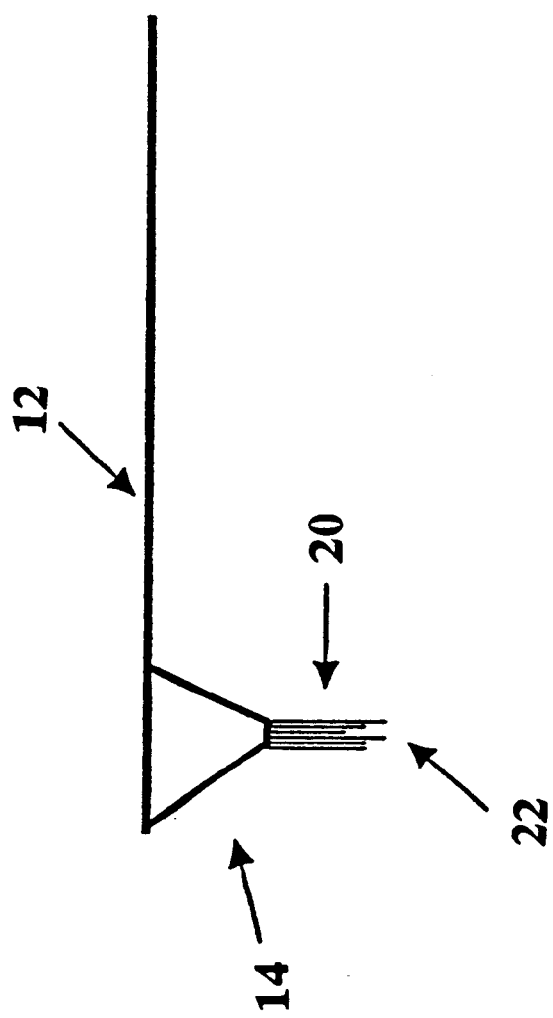
FIG. 1 is a schematic representation of a conventional nanotube bundle attached onto a SFM tip.

Referring to FIG. 1, SFMs typically include a very small cantilever 12 which is fixed at one end and which has a sharp probe tip 14 attached to the opposite end. The probe tip 14 is brought very near to or into contact with a surface to be examined, and the deflection of the cantilever 12 in response to the probe tip's interaction with the sample surface is measured with an extremely sensitive deflection detector attached to the opposite end. More recently, the probe tip 14 has a nanotube bundle 20 attached thereto. A schematic representation of a conventional nanotube bundle 20 attached onto a SFM tip 14 is shown in FIG. 1. The working end of the nanotube bundle 20 is arbitrary, with a number of nanotubes protruding different distances from the SFM tip, which limits the size of the sample that can be imaged. For example, a sample with valleys that are narrower or deeper than the CNT bundle 20 cannot be imaged with a conventional CNT bundle 20 because the bundle 20 cannot contact the valley bottom.

Described herein is a method for controlling the endform 22 of the nanotube bundle 20 so that only one nanotube protrudes from it. The method uses specially patterned silicon substrates to predictably "sharpen" the nanotube bundle so that only a single nanotube protrudes from the CNT 20 and acts as the functional probe in SFM. The single nanotube that protrudes from the CNT 20 decreases the size of the protruding nanotube tip that probes the sample. This increases the resolution obtainable from the SFM.

To sharpen a nanotube bundle 20, the following method, which is based on a scanning force microscopy (SFM) procedure, is used. A silicon substrate is first etched into a pattern of V-shaped grooves of known geometries and spatial separations. Preferably this is done using X-ray lithography, which is well known and need not be described in any further detail herein.

Figure 2A:
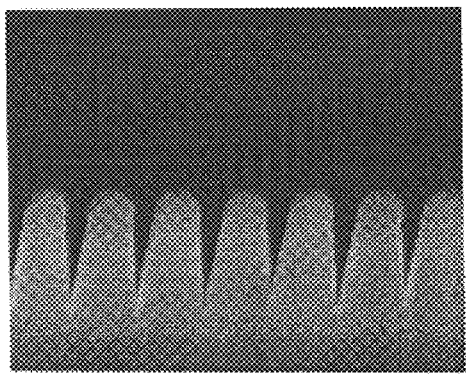
FIG. 2A is a side view of a typical V-groove substrate for shaping CNT tips.
Figure 2B:
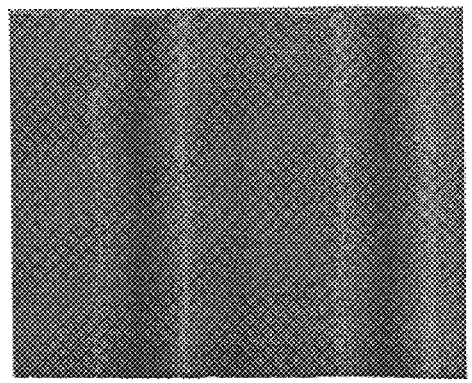
FIG. 2B is a top view of the V-groove substrate of FIG. 1A.
Figure 3:
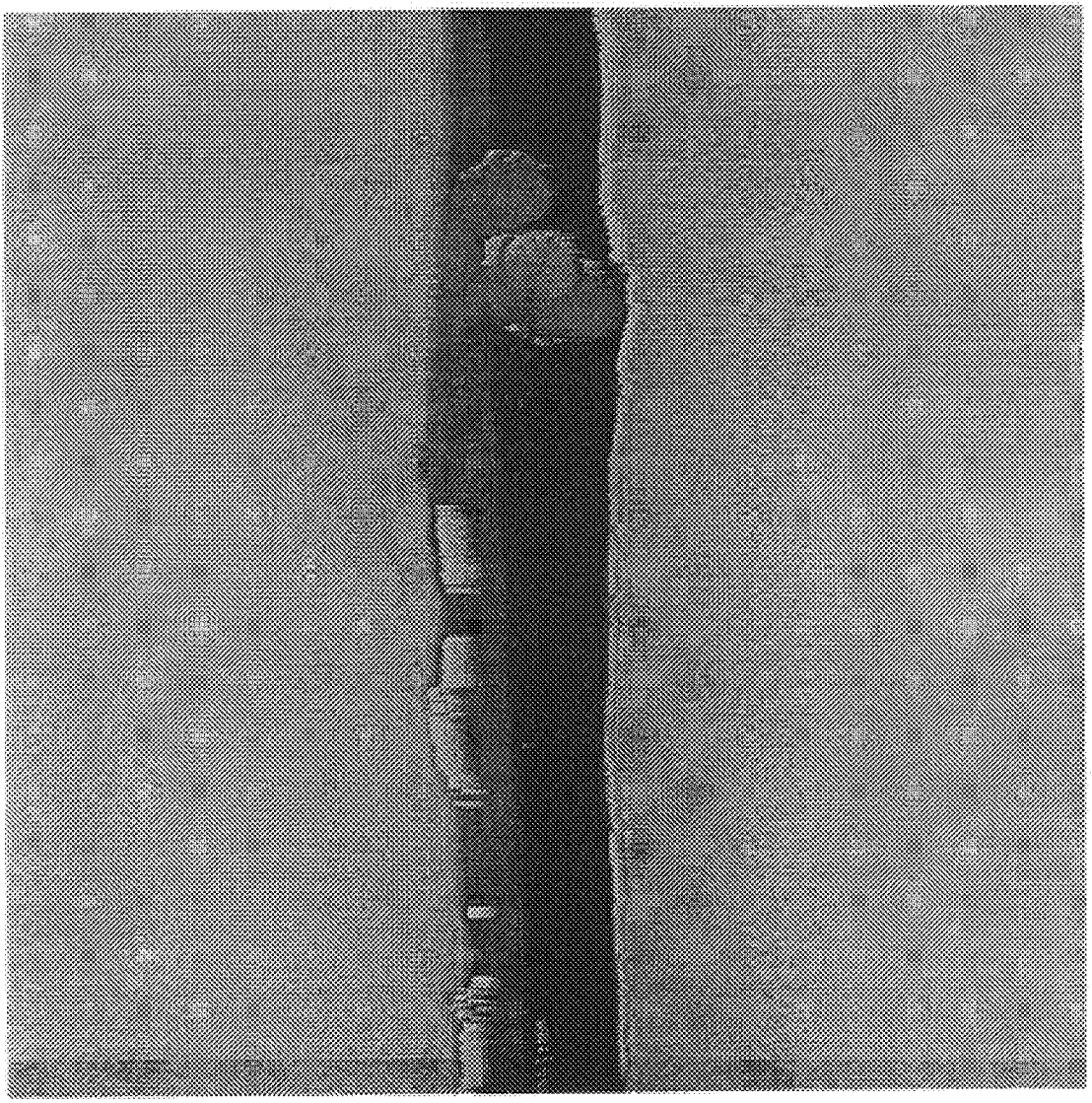
FIG. 3 is an AFM image of a V-groove taken with a CNT tip immediately after shaping this CNT in the V-groove.

V-shaped grooves of different sizes have been investigated. For example, a silicon sample was prepared which had etched upon its surface a series of V-shaped grooves that are 200 nm wide and 500 nm deep. A scanning electron microscope (SEM) image of the sample cross-section and a top plan view are shown in FIGS. 2A and 2B. The photoresist is still present in this image, but is removed prior to use for shaping CNT tips. FIG. 3 shows an AFM image of a V-shaped groove taken with a CNT tip immediately after shaping this CNT in the V-shaped groove. The three circular patterns near the top are carbon deposited into the V-shaped groove after shortening three times.

The patterned silicon sample is then coated with a very thin layer of conductive material, such as platinum, to increase its conductivity. CNTs are shortened using the conventional "burn" method on a flat, unpatterned sample until their length reaches a suitable value to allow imaging of the sample surface in intermittent contact mode.

Figure 4:
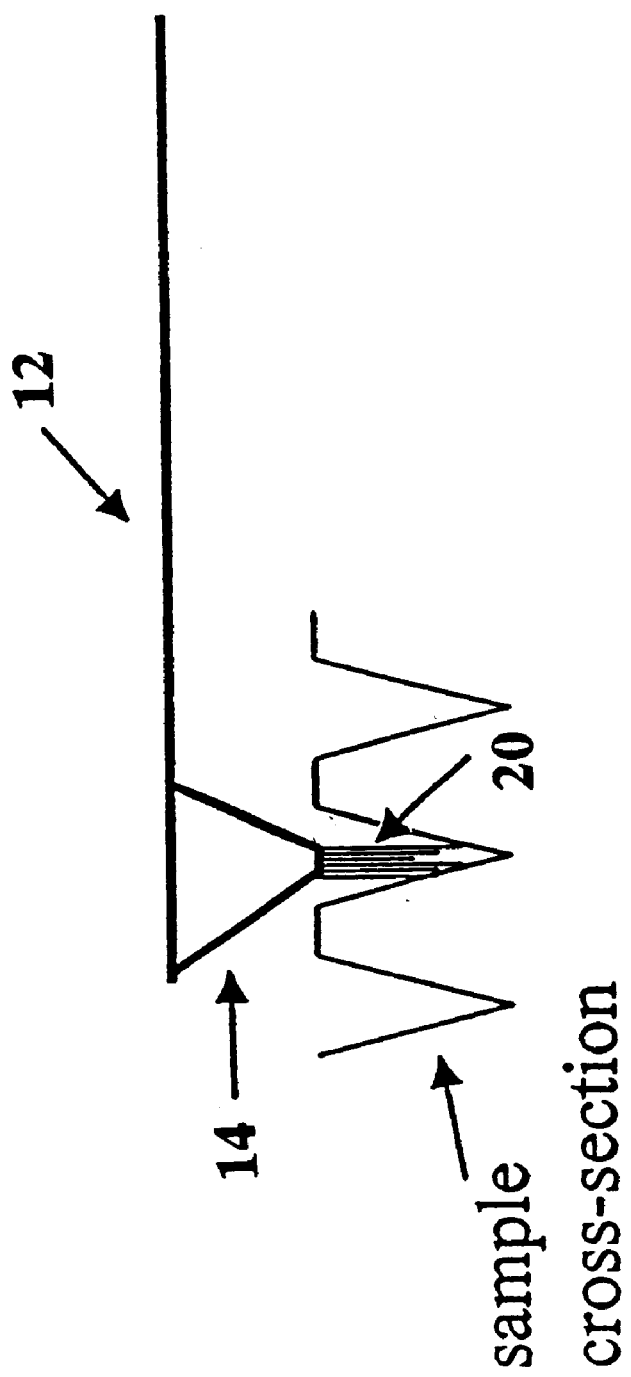
FIG. 4 is a schematic representation of a CNT bundle in a V-groove before shaping.

The flat, unpatterned sample is then replaced with the patterned sample. The CNTs are further shortened while contacting the tip in the deepest point of one of the V-grooves. To locate the deepest point in the groove, an area of the patterned sample is imaged and the tip is positioned inside a groove. A schematic diagram of this positioning shown in FIG. 4. A voltage, preferably in the range of about 5 to 20 V is then applied to shorten the nanotubes and the tapping amplitude during shortening is set to between about 5–20 nm. When the CNT contact the walls of the V-grooves, the outermost portions of the tip are burned away, thereby exposing only a single nanotube. The method described herein, in effect, thereby "sharpens" a nanotube bundle.

Figure 5A:
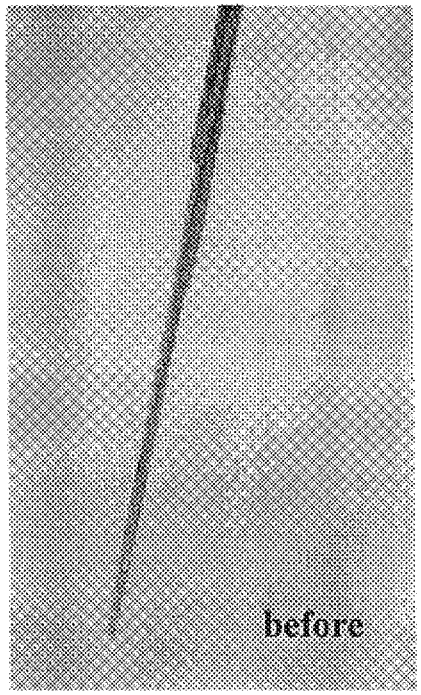
FIG. 5A is a TEM micrograph of a multi-wall CNT bundle before shaping.
Figure 5B:
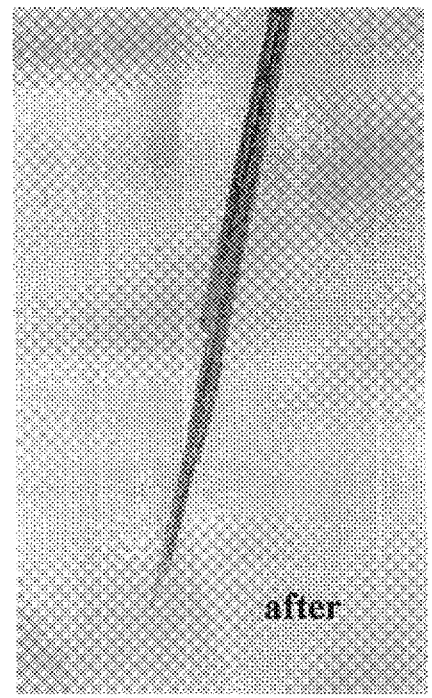
FIG. 5B is a TEM micrograph of a multi-wall CNT bundle after shaping.

Different users require different lengths and stiffness of probes. The method described herein allows these properties to be obtained. To obtain consistency in fabrication, transmission electron microscope (TEM) images of the CNTs before and after shaping are obtained. TEM images of the CNTs before and after shortening in the V-grooves confirms that the process "sharpens" a nanotube bundle. An example is shown in FIG. 5A (before shaping) and FIG. 5B (after shaping). The arrow indicates the same position along the bundle before and after the sharpening procedure. By comparing FIGS. 5A and 5B, it is clear that the bundle endform has been sharpened, following this procedure. The endform of the nanotube resembles a V-shape, with a nanotube protruding from the bundle. The V-shape is common after following this shortening procedure.

1.2. Probe Lifetime, Probe Wear, and Effect on Sample

Important aspects of CNT probes for AFM, critical-dimension metrology, or surface profilometry include the lifetime of the tip, the effect of the tip on the sample being measured, the wear of the tip, and the degree to which the tip leaves debris as it wears (this being an important aspect of semiconductor metrology). The effect of the CNT probe and conventional Si-tip AFM cantilever probes on the sample being imaged have been compared, by imaging SiGe quantum dots on Si(001) (6). These quantum dots are regularly shaped pyramids with a specific shape (well-defined (105) facets) and a typical height of 5 nm and base width of 50 nm. Intermittent-contact mode was used in both cases.

Figure 6A:
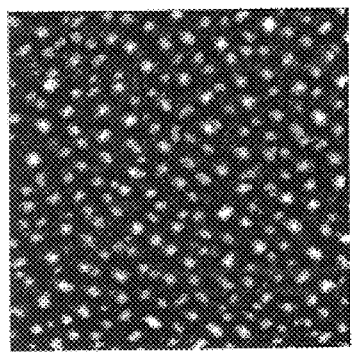
FIGS. 6A–D show a comparison of image degradation in AFM scans of SiGe quantum dots on Si(001) using a conventional Si tip (FIGS. 6A–C) and CNT probes (FIGS. 6D–F). All scans are 1 micron.
Figure 6B:
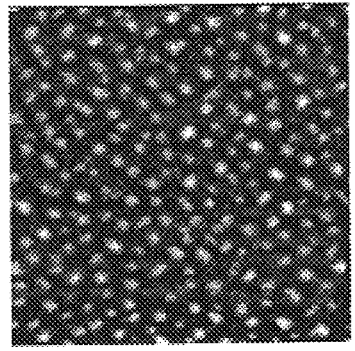
Figure 6C:
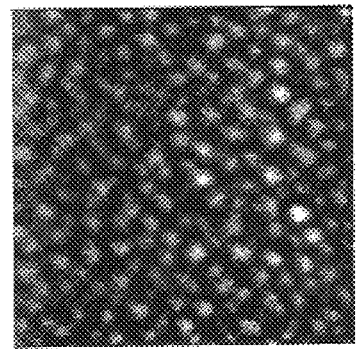
Figure 6D:
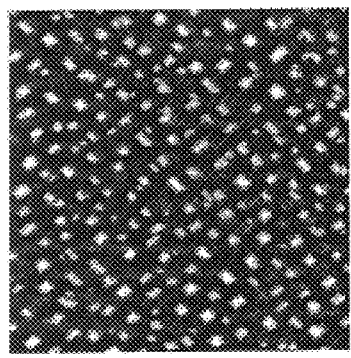
Figure 6E:
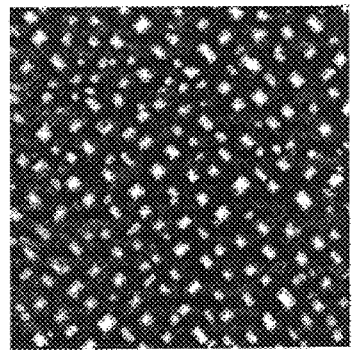
Figure 6F:
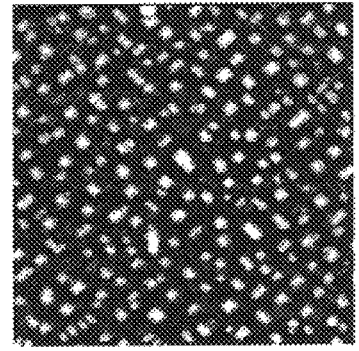

FIGS. 6A–F show the results of scans over a number of hours repeated on the same part of the sample, using a conventional Si AFM tip (FIGS. 6A–C) and a carbon nanotube probe (FIGS. 6D–F). Sample degradation from the conventional tip is noticeable even after 1 h of imaging (FIG. 6B), while there is no noticeable degradation after 9 h of imaging using the carbon nanotube tip (FIG. 6F). It is interesting that even using intermittent contact, the sample being measured using a conventional Si tip can be rapidly degraded. With a nanotube probe, this does not occur. When using a nanotube probe, neither the sample nor the probe itself is adversely affected. The SiGe quantum dots being measured in this experiment are reasonably hard, so it is quite surprising to see this extensive degree of sample wear from a conventional Si AFM tip. The initial resolution provided by the nanotube tip (FIG. 6D) can also be seen to be better than that of a new conventional Si tapping-mode tip (FIG. 6A).

1.3. Imaging High-aspect Ratio Features

Figure 7A:
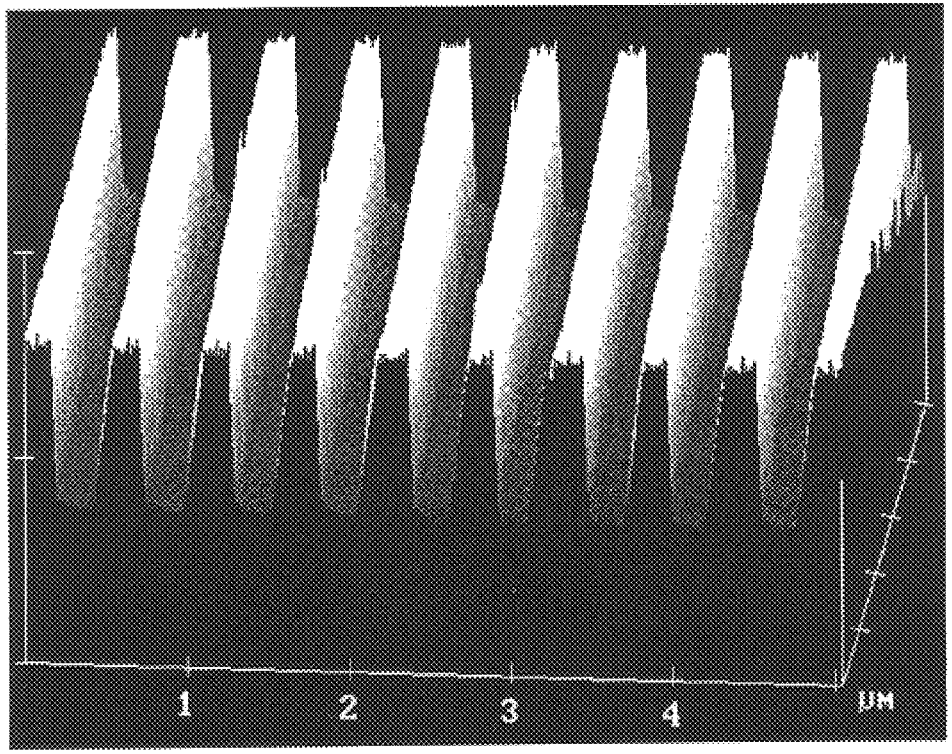
FIGS. 7A–B is a comparison of AFM images of 250 nm wide and 600 nm deep trenches in Si with a CNT tip (FIG. 7A), and a conventional Si tip (FIG. 7B).
Figure 7B:
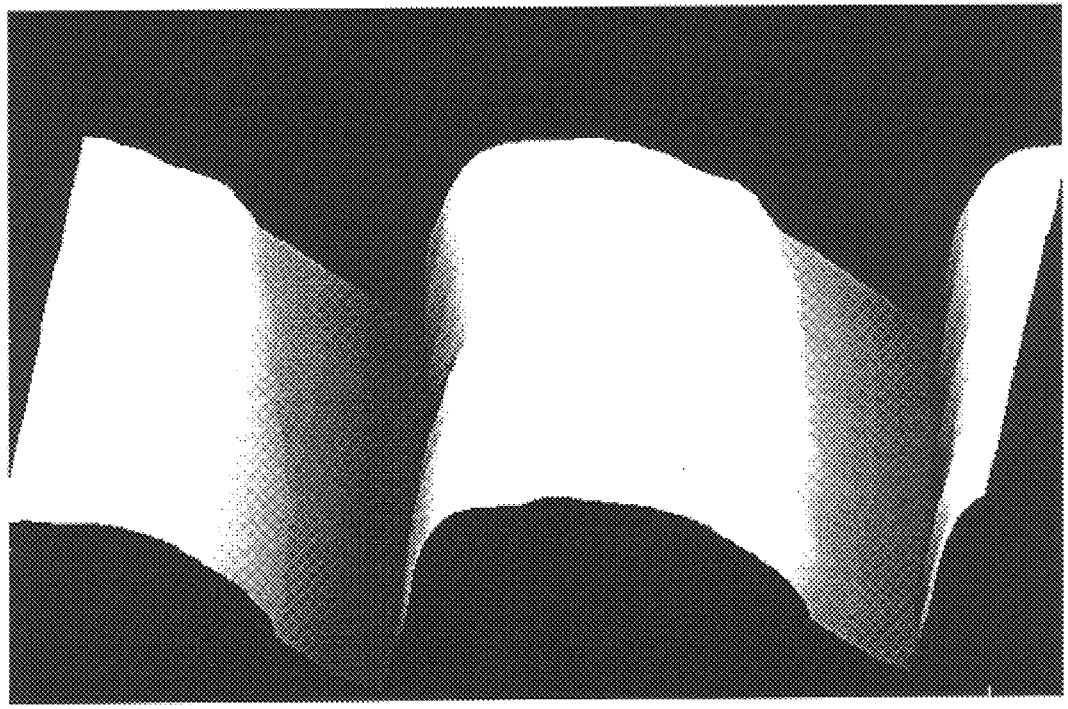

The capabilities of nanotube tips to image narrow trenches were investigated. FIGS. 7A–B show 250 nm-wide and 600 nm-deep trenches etched in Si imaged by both a nanotube tip (FIG. 7A) and a conventional tip (FIG. 7B). As can be seen from FIG. 7B, when a conventional tip is used, the trenches cannot be imaged properly because the tip cannot enter the narrow trench. Because the trench is so narrow, the image of FIG. 7B shows basically the tip shape (convoluted by the width of the trench).

Figure 8A:
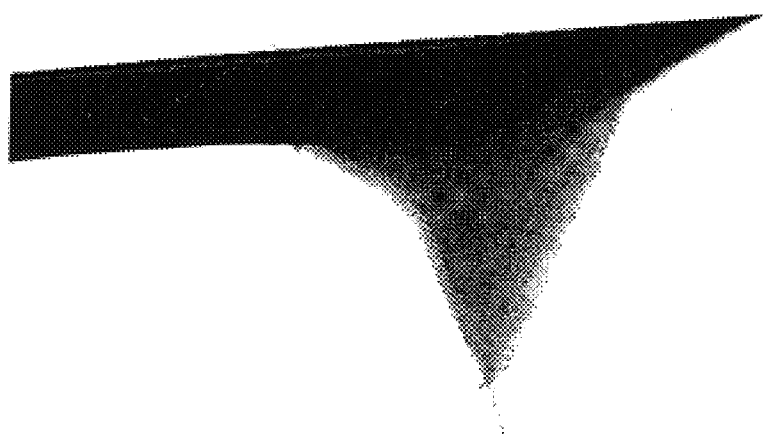
FIGS. 8A–B show TEM images of a CNT probe mounted at the end of a conventional Si AFM tip. This tip was used to image the deep trenches shown in FIG. 7A.
Figure 8B:
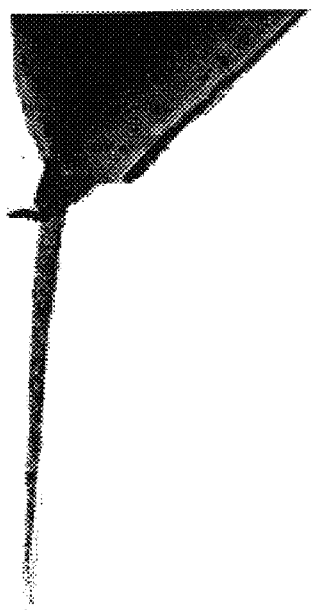

TEM images of the nanotube tip used to obtain the image in FIG. 7A are shown in FIGS. 8A–B. Aspect ratios of 100 are typical with CNTs, values that are essentially not possible to achieve with any other commercially available tip. Tips made with Focused Ion Beam (FIB) or Electron Beam Deposition (EBD) can be very fragile. In contrast, nanotube tips are very robust and yet very gentle when probing a sample. CNTs permit controlling of the orientation of the nanotube relative to the imaged surface. This is a key issue because the nanotube needs to be perpendicular with respect to the surface for vertical walls to be imaged.

2. Tuning Forks and Nanotubes

Presently, the fastest scans are made in contact mode using, an AFM or a profilometer. Even here, however, the scan speed is limited to ~100 Hz. The types of profiling and critical-dimension measurements necessary in the future will most likely necessitate intermittent contact (4). Both the nature of the topology that needs to be probed, and, as a result, the nature of the probes, will require intermittent contact. In the standard implementation of intermittent-contact AFM, an oscillating micromachined cantilever is driven at a constant frequency, and a change in either the amplitude or the phase of the oscillation relative to the driving signal that is caused by a force acting on the cantilever is detected and fed back to the actuator controlling the probe-to-sample distance. The imaging speed is limited by the time required for the oscillation to reach a new steady-state value after a change in the force. To improve on this imaging speed limitation, a phase-locked-loop (PLL) can be used (7), in which the driving frequency is dynamically corrected in response to the changes in the phase of the oscillation of the cantilever, eliminating the need for the imaging system to wait for the new steady state.

Recently, scanning probe microscopes using a high-Q quartz resonator as the force sensor, rather than a micromachined cantilever, have been demonstrated. Most notably, it has been shown that a standard quartz crystal tuning fork, the same kind as found in quartz watches, can be used (8) (see also Thermomicroscopes/Topometrix Near-field Scanning Optical Microscope (NSOM)).

The feasibility of using Si tuning forks was investigated. The motivation behind this is the theory that optimal scanning parameters (high resonant frequency and high Q) through different tuning fork geometries should be achievable. For testing purposes, the attachment and testing of carbon nanotubes onto commercial tuning forks used as SPM probes was pursued.

Figure 9A:
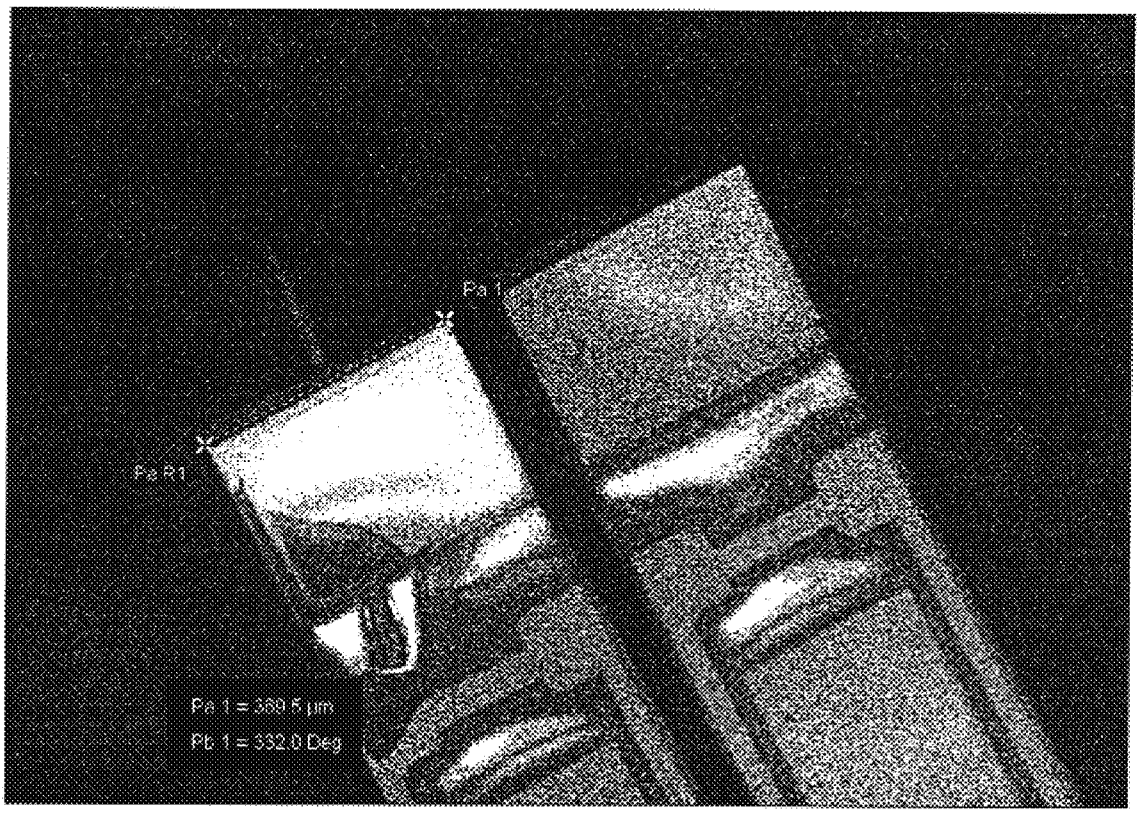
FIG. 9A is an SEM image of the end of a commercial NSOM tuning fork with an optical fiber protruding from the end of the tuning fork.
Figure 9B:
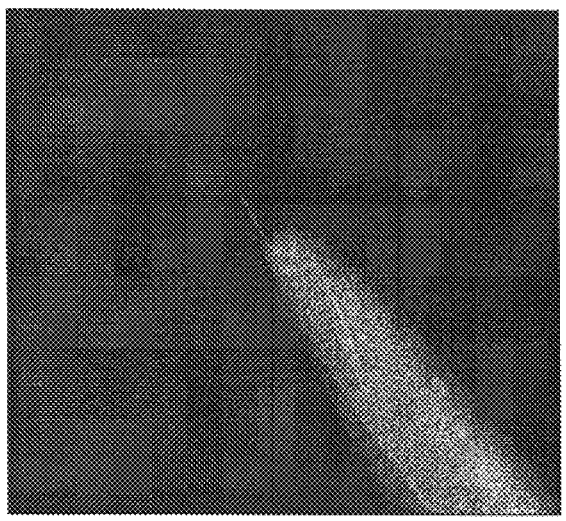
FIG. 9B shows (in the upper left) CNTs mounted on the end of the optical fiber protruding from the end of the tuning fork of FIG. 9A.
Figure 9C:
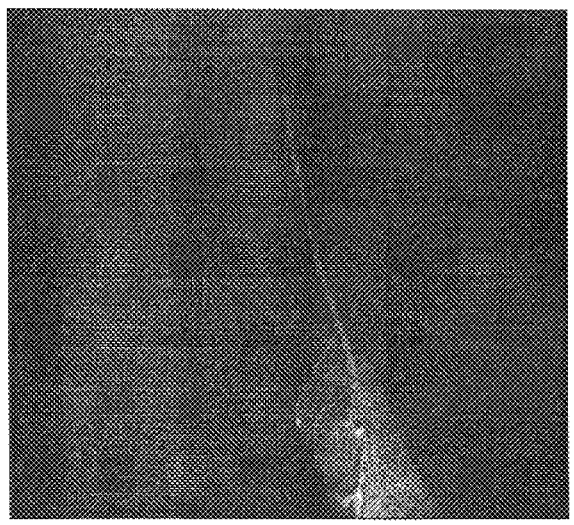
FIG. 9C shows CNTs mounted on the end of the optical fiber protruding from the end of the tuning fork.

A commercial Near-field Scanning Optical Microscope (NSOM) (Aurora from Thermomicroscopes) was used. The tuning forks used in this system have a resonant frequency of ~90 KHz and a Q of 200. The Q is low because a fiber is glued on one of the prongs. A SEM image of the part of the prongs with the optical fiber protruding is shown in FIG. 9A. Carbon nanotubes were mounted onto the optical fiber of several tuning forks. Two of the resulting probes are shown in FIGS. 9B–C. The nanotube in FIGS. 9B is approximately 3 $\mu$m long (i.e., 3000 nm), while the one in FIG. 9C is approximately 300 nm long. In the Aurora NSOM, the tuning fork is oscillated parallel to the sample (shear force mode) at a constant frequency (typically the resonant frequency). The amplitude of oscillation decreases when the tuning fork approaches the sample. This is used as a feedback signal: the oscillation amplitude is maintained constant during scanning. The relatively high Q of the tuning fork does not allow for fast scanning in this mode. Typically it takes 0.5 hours to collect a relatively small image (~20,000 pixels). A phase locked loop (PLL) circuit, in which the resonant frequency of the tuning fork is continuously adjusted during scanning greatly improves the scanning speed.

Figure 10:
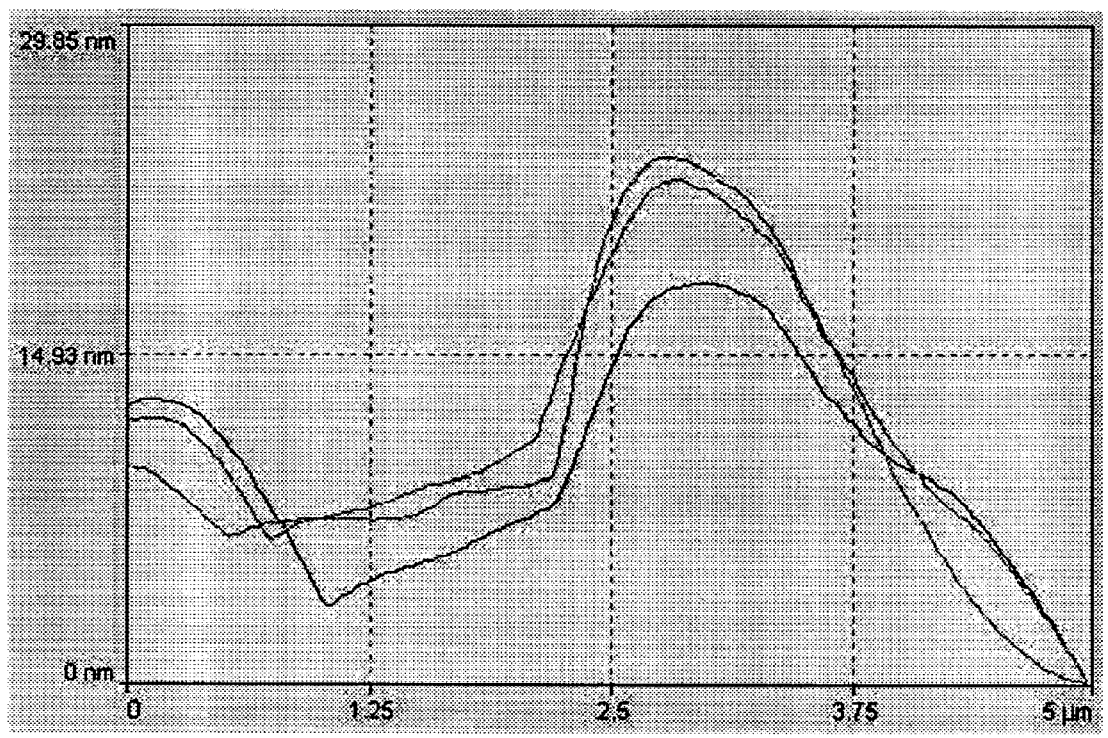
FIG. 10 illustrates scans using a 3 $\mu$m CNT probe attached to a tuning fork. A commercially available NSOM device having attached thereto the probe shown in FIG. 9B was used to generate the 5 $\mu$m scan.
Figure 11:
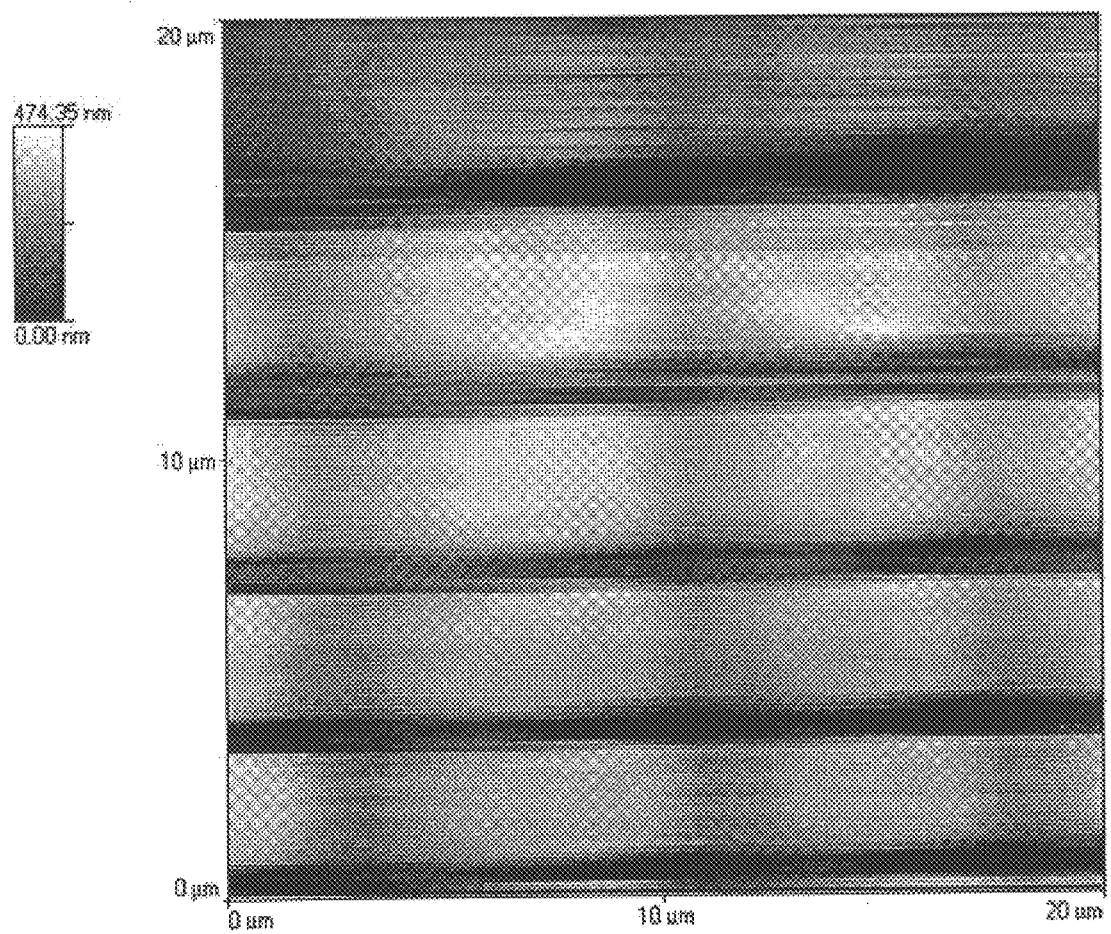
FIG. 11 illustrates scans using a 300 nm CNT probe attached to a tuning fork. A commercially available NSOM device having attached thereto the 300 nm probe shown in FIG. 9C was used to generate this figure. The scan dimensions are 20 $\mu$m×20 $\mu$m.

Due to the length of the nanotube shown in FIG. 9B stable imaging conditions were not obtainable for very long. Some line scans over a test sample are shown in FIG. 10. Better results were obtained using the shorter nanotube (FIG. 9C). A scan of the test sample (grid) using the probe of FIG. 9C is shown in FIG. 11.

A combination of tuning forks and nanotubes can be used as probes for SPM. The high aspect ratio of the nanotube does not, however, provide any advantage when the tuning fork is oscillated parallel to the surface. However, the microscope head can be modified to allow the tuning fork and attached nanotube to be oscillated perpendicular to the surface. Intermittent-contact mode with a tuning fork has recently been demonstrated (9). FIG. 9B shows another very encouraging result, namely that nanotube probes were fabricated that were at least 3 $\mu$m long. These probes should allow us to probe most any surface profile.

Thus, the value of carbon nanotubes as probes for surface metrology has been demonstrated. Their high-aspect ratio enables profiling of morphologies that are inaccessible to conventional probes. No tip or sample wear was observed over time with CNT probes, contrary to results with conventional probes. Also demonstrated was that a combination of tuning forks and nanotubes can be used as probes for SPM.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. The invention is not intended to be limited to the preferred embodiments described above, but rather is intended to be limited only by the claims set out below.

BIBLIOGRAPHY

1. H. J. Dai, J. H. Hafner, A. G. Rinzier, D. T. Colbert and R. E. Smalley, Nanotubes as nanoprobes in scanning probe microscopy," *Nature* 384, pp. 147–150, 1996.
2. E. W. Wong, P. E. Sheehan and C. M. Lieber, "Nanobeam Mechanics: Elasticity, Strength, and Toughness of Nanorods and Nanotubes," *Science* 277, pp. 1971–1975, 1997.
3. J. H. Hafner, C. L. Cheung and C. M. Lieber, "Growth of nanotubes for probe microscopy tips," *Nature* 398, pp. 761–762, 1999.
4. Q. Zhong, D. Innis, K. Kjoller and V. B. Elings, "Fractured polymer/silica fiber surface studied by tapping mode atomic force microscopy," *Surf Sci.* 290, pp. L385–L688–692, 1993.
5. K. Karrai and R. D. Grober, "Piezoelectric tip-distance control for near field optical microscopes," *Appl. Phys. Lett.* 66, pp. 1842–1844, 1995.
6. Y.-W. Mo, D. E. Savage, B. S. Swartzentruber, and M. G. Lagally, "Stress-Induced Self-Organization of Nanoscale Structures in SiGe/Si Multilayer Films", *Phys. Rev. Letters* 65, pp. 1020, 1990.
7. T. R. Albrecht, P. Grutter, D. Horne and D. Rugar, "Frequency modulation detection using high-Q cantilevers for enhanced force microscope sensitivity," *J. Appl. Phys.* 69, pp. 668–673, 1991.
8. H. Edwards, L. Taylor and W. Duncan, "Fast, high-resolution atomic force microscopy using a quartz tuning fork as actuator and sensor," *J Appl. Phys.* 82, pp. 980–984, 1997.
9. D. P. Tsai and Y. Y. Lu, "Tapping-mode tuning fork force sensing for near-field scanning optical microscopy," *Appl. Phys. Lett.* 73, pp. 2724–2726, 1998.

What is claimed is:

1. A method of sharpening a nanotube bundle comprising:
   (a) providing a substrate having at least one V-shaped groove disposed therein and further having a thin layer of conductive material coated thereon;
   (b) disposing a nanotube bundle within the V-shaped groove; and then
   (c) applying a voltage to the nanotube bundle, whereby the outermost portions of the nanotube bundle are burned away, thereby exposing a single nanotube.

2. The method of claim 1, wherein in step (a) a pattern of V-shaped grooves is provided by etching V-shaped grooves of known geometries and spatial separations.

3. The method of claim 2, wherein in step (a) the pattern is provided by etching 200 nm wide by 500 nm deep V-shaped grooves in the substrate.

4. The method of claim 1, wherein in step (a) the V-shaped groove is provided by etching the substate via X-ray lithography.

5. The method of claim 1, wherein in step (a) the substrate is coated with a metal.

6. The method of claim 5, wherein in step (a) the substrate is coated with platinum.

7. The method of claim 1, wherein in step (c) the voltage applied is about 5 to 20 V.

8. The method of claim 1, wherein in step (c) a tapping amplitude during the application of the voltage is set to between about 5 to 20 nm.

9. The method of claim 1, wherein the nanotube is a single-walled carbon nanotube.

10. The method of claim 1, wherein the nanotube is multiple-walled carbon nanotube.

11. The method of claim 1, wherein the substrate is a silicon substrate.

12. A method of sharpening a nanotube bundle comprising:
   (a) providing a silicon substrate having a pattern of V-shaped grooves of known geometries and spatial separations disposed therein and having a thin layer of metal coated thereon;
   (b) shortening a nanotube bundle comprising a plurality of nanotubes by contacting the bundle to a flat, unpatterned, electrically conductive surface and applying a voltage to the bundle, whereby the bundle is shortened until its length reaches a value suitable to allow scanning probe imaging of the patterned silicon substrate of step (a);
   (c) sharpening the bundle by disposing it in a V-shaped groove in the patterned silicon substrate of step (a) and applying a voltage to the bundle, whereby outermost portions of the bundle are burned away, thereby exposing only a single nanotube.

13. The method of claim 12, wherein in step (c), a voltage of from about 5 to 20 V is applied to the bundle.

14. A sharpened nanotube bundle fabricated by a series of steps comprising:
   (a) providing a substrate having at least one V-shaped groove disposed therein and further having a thin layer of conductive material coated thereon;
   (b) disposing a nanotube bundle within the V-shaped groove; and then
   (c) applying a voltage to the nanotube bundle, whereby the outermost portions of the nanotube bundle are burned away, thereby exposing a single nanotube.

15. The sharpened nanotube bundle according to claim 14, wherein the nanotube bundle is a carbon nanotube bundle.

16. A sharpened nanotube bundle fabricated by a series of steps comprising:
  (a) providing a silicon substrate having a pattern of V-shaped grooves of known geometries and spatial separations disposed therein and having a thin layer of metal coated thereon;
  (b) shortening a nanotube bundle comprising a plurality of nanotubes by contacting the bundle to a flat, unpatterned, electrically conductive surface and applying a voltage to the bundle, whereby the bundle is shortened until its length reaches a value suitable to allow scanning probe imaging of the patterned silicon substrate of step (a);
  (c) sharpening the bundle by disposing it in a V-shaped groove in the patterned silicon substrate of step (a) and applying a voltage to the bundle, whereby outermost portions of the bundle are burned away, thereby exposing only a single nanotube.

17. The sharpened nanotube bundle according to claim 16, wherein the nanotube bundle is a carbon nanotube bundle.

18. A method of manufacturing a probe for use with a scanning force microscope comprising:
  (a) providing a tuning fork having prongs and having an optical fiber attached to one of the prongs; and
  (b) attaching a carbon nanotube bundle to the optical fiber.

19. The method of claim 18, wherein the tuning fork provided is a silicon tuning fork.

20. The method of claim 18, wherein the optical fiber is attached to one of the prongs with glue.

21. The method of claim 18, wherein the carbon nanotubes are from approximately 3 $\mu$m to approximately 300 nm long.

* * * * *